United States Patent
Li et al.

(10) Patent No.: US 9,080,619 B2
(45) Date of Patent: Jul. 14, 2015

(54) CLUTCH SLIP IDENTIFICATION SYSTEMS AND METHODS

(71) Applicant: GM Global Technology Operations LLC, Detroit, MI (US)

(72) Inventors: Dongxu Li, Warren, MI (US); Timothy R. Stockdale, Woverine Lake, MI (US); David C. Webert, Livonia, MI (US)

(73) Assignee: GM Global Technology Operations LLC

( * ) Notice: Subject to any disclaimer, the term of this patent is extended or adjusted under 35 U.S.C. 154(b) by 0 days.

(21) Appl. No.: 13/934,299

(22) Filed: Jul. 3, 2013

(65) Prior Publication Data

US 2014/0309899 A1    Oct. 16, 2014

Related U.S. Application Data

(60) Provisional application No. 61/810,911, filed on Apr. 11, 2013.

(51) Int. Cl.
| | |
|---|---|
| *F16D 48/06* | (2006.01) |
| *F16D 48/02* | (2006.01) |
| *F16H 61/14* | (2006.01) |
| *F16D 48/00* | (2006.01) |

(52) U.S. Cl.
CPC ............ *F16D 48/06* (2013.01); *F16D 48/02* (2013.01); *F16D 48/00* (2013.01); *F16D 48/066* (2013.01); *F16H 61/143* (2013.01); *F16H 2061/145* (2013.01)

(58) Field of Classification Search
CPC ..... B60W 10/00; B60W 10/02; B60W 10/11; F16H 61/00; F16H 61/14; F16H 61/688; F16H 45/02; F16H 15/00; F16H 15/02; G06F 17/00

USPC .............. 701/36, 51–68, 82, 87, 90, 99; 477/34–181; 192/3.51, 3.52, 12 R, 30 R
See application file for complete search history.

(56) References Cited

U.S. PATENT DOCUMENTS

| | | | | |
|---|---|---|---|---|
| 4,361,060 | A | * | 11/1982 | Smyth ............................. 477/78 |
| 4,720,793 | A | | 1/1988 | Watanabe et al. |
| 5,337,874 | A | * | 8/1994 | Oltean et al. ............. 192/70.252 |

(Continued)

FOREIGN PATENT DOCUMENTS

JP    2007298014 A    11/2007

OTHER PUBLICATIONS

U.S. Appl. No. 13/446,097, filed Apr. 13, 2012, Dongxu Li.

(Continued)

*Primary Examiner* — Thomas Tarcza
*Assistant Examiner* — Tyler J Lee

(57) ABSTRACT

A control system for a transmission of a vehicle includes a first angular rotation module, a second angular rotation module, and a slip module. The first angular rotation module determines a first angular rotation of a first component of the transmission during a predetermined period based on a first signal generated by a first sensor. The second angular rotation module determines a second angular rotation of a second component of the vehicle during the predetermined period based on a second signal generated by a second sensor. The slip module selectively indicates that a clutch of the transmission is slipping based on the first angular rotation and the second angular rotation.

18 Claims, 5 Drawing Sheets

(56) References Cited

U.S. PATENT DOCUMENTS

| | | | |
|---|---|---|---|
| 5,508,923 A | 4/1996 | Ibamoto et al. | |
| 5,559,705 A | 9/1996 | McClish et al. | |
| 5,636,121 A | 6/1997 | Tsuyama et al. | |
| 5,754,967 A | 5/1998 | Inoue et al. | |
| 6,199,005 B1 | 3/2001 | Iwata | |
| 6,278,915 B1 | 8/2001 | Deguchi et al. | |
| 6,306,062 B1 | 10/2001 | Toukura et al. | |
| 6,418,365 B1 | 7/2002 | Loffler et al. | |
| 6,487,486 B1 | 11/2002 | Anderson | |
| 6,513,611 B2 | 2/2003 | Ito et al. | |
| 6,634,451 B2 | 10/2003 | Sakakiyama | |
| 7,104,119 B1 | 9/2006 | Trapasso et al. | |
| 7,110,869 B2 | 9/2006 | Tao et al. | |
| 7,162,353 B2 | 1/2007 | Minowa et al. | |
| 7,359,787 B2 | 4/2008 | Ono et al. | |
| 7,400,993 B2 | 7/2008 | Shaver et al. | |
| 7,445,581 B2 | 11/2008 | Cring | |
| 7,559,259 B2 | 7/2009 | Fruhwirth et al. | |
| 7,611,441 B2 | 11/2009 | Cring | |
| 7,731,630 B2 * | 6/2010 | League et al. | 477/155 |
| 7,788,010 B2 | 8/2010 | Kondo et al. | |
| 7,856,337 B2 | 12/2010 | Kulczyk et al. | |
| 7,920,950 B2 * | 4/2011 | Nihanda | 701/69 |
| 7,942,228 B2 | 5/2011 | Fenker et al. | |
| 8,046,142 B2 | 10/2011 | Morris et al. | |
| 8,296,026 B2 * | 10/2012 | Maeda et al. | 701/67 |
| 8,296,038 B2 | 10/2012 | Verdejo et al. | |
| 8,340,879 B2 * | 12/2012 | Glatthaar et al. | 701/67 |
| 8,457,847 B2 | 6/2013 | Li | |
| 8,532,890 B2 | 9/2013 | Wellenkotter et al. | |
| 8,620,543 B2 | 12/2013 | Li et al. | |
| 2006/0122755 A1 * | 6/2006 | Segawa et al. | 701/67 |
| 2008/0011103 A1 | 1/2008 | Fruhwirth et al. | |
| 2009/0181824 A1 * | 7/2009 | Baeuerle | 477/169 |
| 2010/0279811 A1 | 11/2010 | Portell et al. | |
| 2012/0078475 A1 | 3/2012 | Li et al. | |
| 2012/0078476 A1 | 3/2012 | Li et al. | |
| 2013/0124056 A1 | 5/2013 | Wellenkotter et al. | |
| 2013/0218426 A1 | 8/2013 | Li et al. | |
| 2013/0275015 A1 | 10/2013 | Li et al. | |
| 2014/0207348 A1 * | 7/2014 | Wakayama et al. | 701/54 |

OTHER PUBLICATIONS

U.S. Appl. No. 13/585,988, filed Aug. 15, 2012, Dongxu Li.
U.S. Appl. No. 13/934,270, filed Jul. 3, 2013, Dongxu Li.

\* cited by examiner

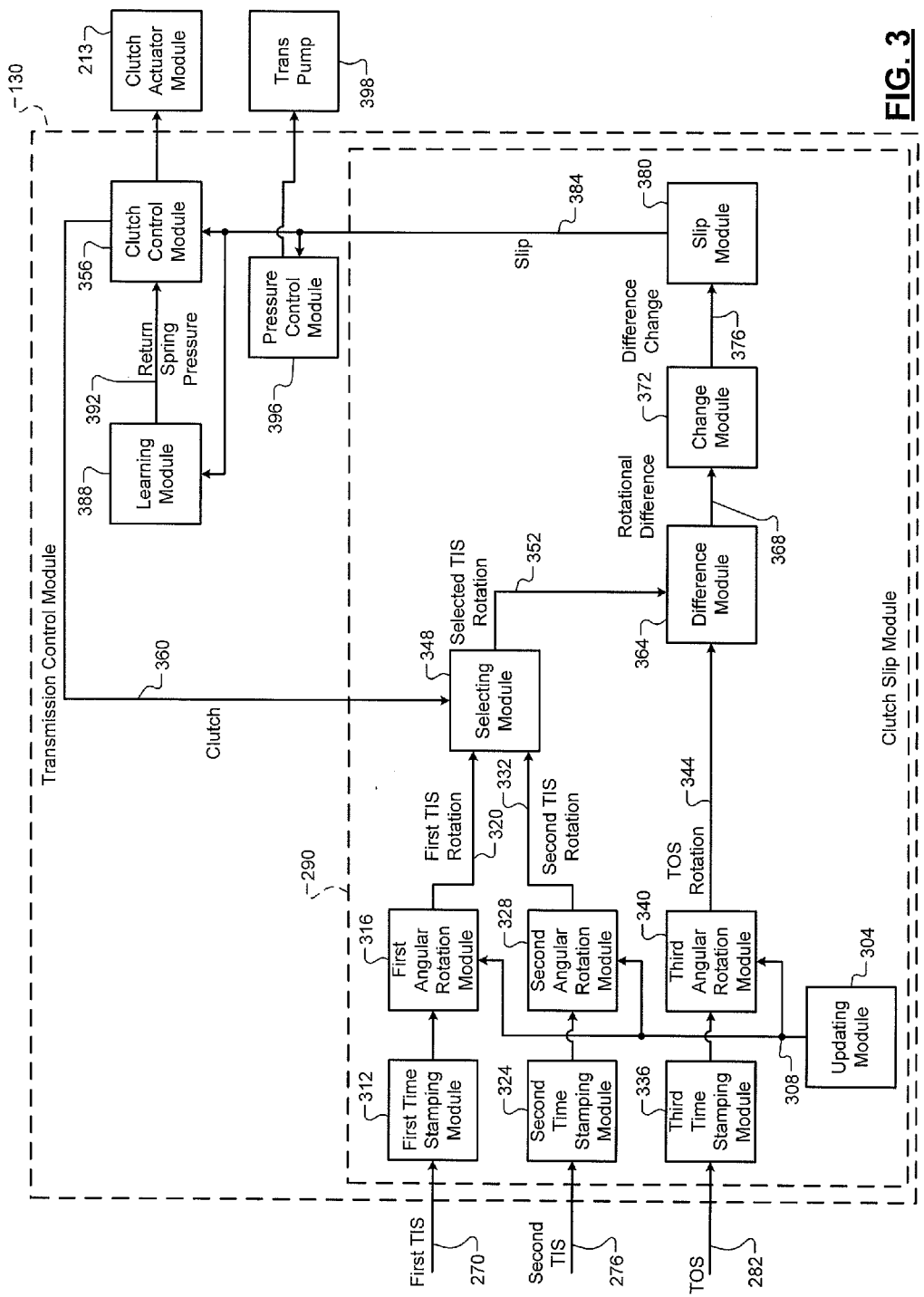

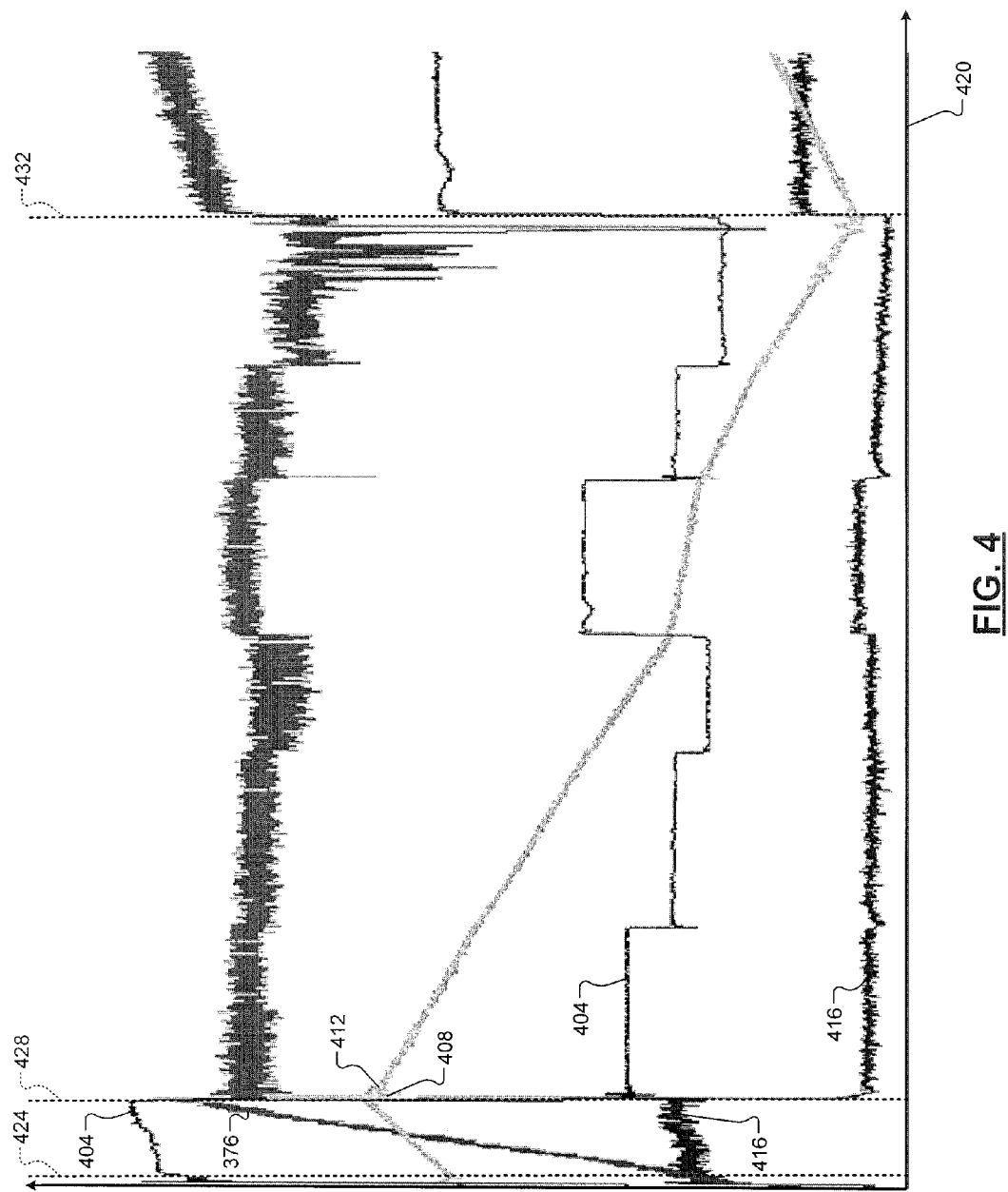

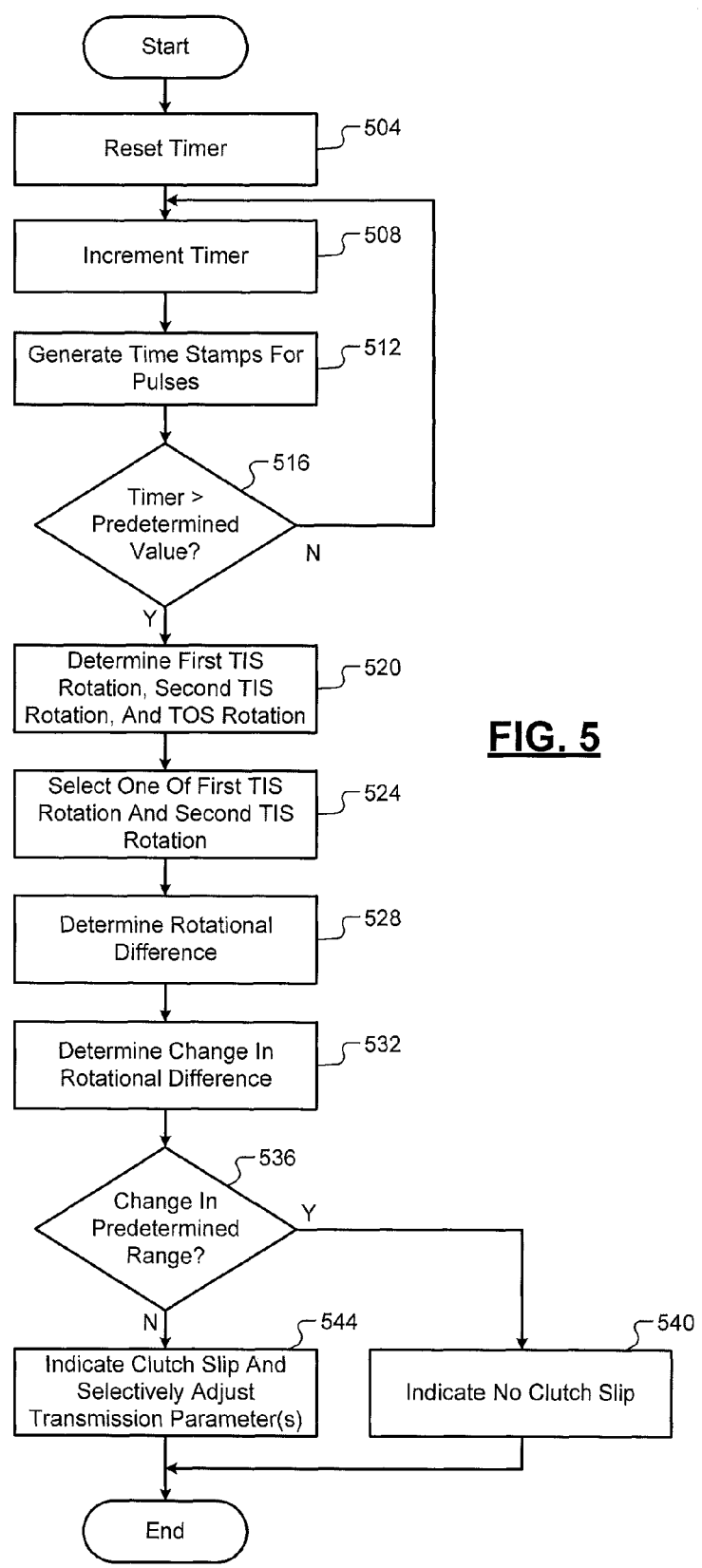

CLUTCH SLIP IDENTIFICATION SYSTEMS AND METHODS

CROSS-REFERENCE TO RELATED APPLICATIONS

This application claims the benefit of U.S. Provisional Application No. 61/810,911, filed on Apr. 11, 2013. The disclosure of the above application is incorporated herein by reference in its entirety.

The present disclosure is related to U.S. patent application Ser. No. 13/934,270 filed on Jul. 3, 2013. The entire disclosure of the application reference above is incorporated herein by reference.

FIELD

The present disclosure relates to transmissions of vehicles and more particularly to clutch control systems and methods.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel mixture to produce drive torque. One or more electric motors may additionally or alternatively produce drive torque. Drive torque is provided to a transmission, and the transmission transfers torque to one or more wheels to propel the vehicle.

A dual clutch transmission (DCT) includes two clutches. Each clutch is associated with one independent input shaft. An odd gearset is coupled to one of the two input shafts and an even gearset is coupled to the other of the two input shafts. Generally, one of the two clutches is engaged while the other of the two clutches is not. In this manner, drive torque is transferred to one of the two input shafts and gearsets.

Gear synchronizers move along an output shaft of the DCT to mechanically couple gearsets to the output shaft. While torque is being transferred to one of the two input shafts and gearsets, another gearset that is coupled to the other one of the two input shafts may be mechanically coupled to the output shaft in anticipation of shifting to that gearset. A shift to that gearset can then be accomplished quickly by disengaging one clutch and engaging the other clutch.

SUMMARY

In a feature, a control system for a transmission of a vehicle is disclosed. A first angular rotation module determines a first angular rotation of a first component of the transmission during a predetermined period based on a first signal generated by a first shaft sensor. A second angular rotation module determines a second angular rotation of a second component of the transmission during the predetermined period based on a second signal generated by a second sensor. A slip module selectively indicates that a clutch of the transmission is slipping based on the first angular rotation and the second angular rotation.

In further features, the first component is a transmission input shaft (TIS), the first sensor is a TIS sensor, the second component is a transmission output shaft (TOS), and the second sensor is a TOS sensor.

In still further features, a difference module determines a difference in rotation of the TIS and the TOS during the predetermined period based on the first angular rotation, the second angular rotation, and a gear ratio of the transmission. The slip module selectively indicates that the clutch is slipping based on the difference.

In yet further features, the difference module sets the difference based on the first angular rotation minus a value equal to a product of the second angular rotation and the gear ratio.

In further features, a change module determines a change in the difference based on the difference and a previous value of the difference. The slip module selectively indicates that the clutch is slipping based on the change.

In still further features, the slip module indicates that the clutch is slipping when the change is one of greater than and less than a predetermined value.

In yet further features, a third angular rotation module determines a third angular rotation of a second TIS during the predetermined period based on a third signal generated by a second TIS sensor. The slip module selectively indicates that the clutch is slipping based on the second angular rotation and a selected one of the first angular rotation and the third angular rotation.

In further features, a selecting module selects one of the first angular rotation and the third angular rotation based on whether the clutch is coupled to the TIS or to the second TIS.

In yet further features, a pressure control module selectively adjusts output of a transmission fluid pump based on whether the slip module indicates that the clutch is slipping.

In still further features, a pressure control module decreases a pressure applied to the clutch when the slip module indicates that the clutch is not slipping and increases the pressure applied to the clutch when the slip module indicates that the clutch is slipping.

In a feature, a control method for a vehicle is disclosed. The control method includes: determining a first angular rotation of a first component of a transmission during a predetermined period based on a first signal generated by a first sensor; determining a second angular rotation of a second component of the transmission during the predetermined period based on a second signal generated by a second sensor; and selectively indicating that a clutch of a transmission is slipping based on the first angular rotation and the second angular rotation.

In further features, the first component is a transmission input shaft (TIS), the first sensor is a TIS sensor, the second component is a transmission output shaft (TOS), and the second sensor is a TOS sensor.

In still further features, the control method further includes: determining a difference in rotation of the TIS and the TOS during the predetermined period based on the first angular rotation, the second angular rotation, and a gear ratio of the transmission; and selectively indicating that the clutch is slipping based on the difference.

In yet further features, the control method further includes setting the difference based on the first angular rotation minus a value equal to a product of the second angular rotation and the gear ratio.

In further features, the control method further includes: determining a change in the difference based on the difference and a previous value of the difference; and selectively indicating that the clutch is slipping based on the change.

In still further features, the control method further includes: indicating that the clutch is slipping when the change is one of greater than and less than a predetermined value.

In yet further features, the control method further includes: determining a third angular rotation of a second TIS during the predetermined period based on a third signal generated by a second TIS sensor; and selectively indicating that the clutch is slipping based on the second angular rotation and a selected one of the first angular rotation and the third angular rotation.

In further features, the control method further includes: selecting one of the first angular rotation and the third angular rotation based on whether the clutch is coupled to the TIS or to the second TIS.

In still further features, the control method further includes selectively adjusting output of a transmission fluid pump based on whether the clutch is slipping.

In yet further features, the control method further includes: decreasing a pressure applied to the clutch when the clutch is not slipping; and increasing the pressure applied to the clutch when the clutch is slipping.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is a functional block diagram of an example clutch control system according to the present disclosure;

FIG. 4 is an example graph of a change in a rotational difference between transmission input and output shafts, an engine output torque, a transmission input shaft speed, a transmission output shaft speed, and a pressure applied to an engaged clutch versus time according to the present disclosure; and FIG. 5 is a flowchart depicting an example method of determining whether a clutch of a transmission is slipping and controlling one or more operating parameters of the transmission according to the present disclosure.

In the drawings, reference numbers may be reused to identify similar and/or identical elements.

DETAILED DESCRIPTION

A transmission input shaft (TIS) receives drive torque when a clutch is engaged. Torque is transferred from the TIS to a transmission output shaft (TOS) via a selected gearset. The TOS transfers torque to a differential, and the differential transfers torque to wheels. A TIS sensor generates a first output signal based on rotation of the TIS. A TOS sensor generates a second output signal based on rotation of the TOS.

A clutch slip module determines a first amount of rotation of the TIS that occurred within a predetermined period based on the first output signal during the predetermined period. The clutch slip module determines a second amount of rotation of the TOS that occurred during the predetermined period based on the second output signal during the predetermined period.

When a gear shift is not occurring and the clutch is not slipping, a difference between the first amount of rotation of the TIS and the second amount of rotation of the TOS (adjusted for the gear ratio of the selected gearset) should remain relatively constant. The clutch slip module according to the present disclosure determines whether the clutch is slipping based on a change in the difference. For example, the clutch slip module may determine that the clutch is slipping when the change in the difference is outside of a predetermined range and may determine that the clutch is not slipping when the change in the difference is within the predetermined range. The clutch slip module may also measure an amount of slippage of the clutch based on the change in the difference.

Figure 1:
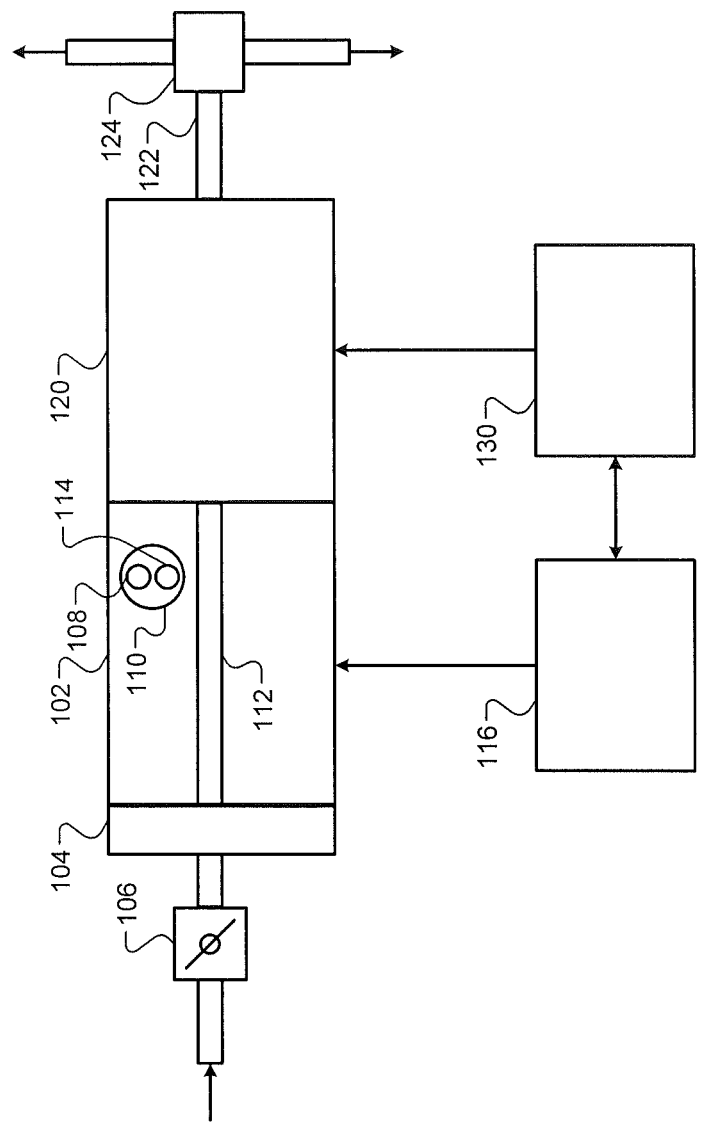
FIG. 1 is a functional block diagram an example powertrain system of a vehicle according to the present disclosure.

Referring now to FIG. 1, a functional block diagram of an example powertrain system of a vehicle is presented. The vehicle includes an engine 102 that generates drive torque. One or more electrical motors (or motor-generators) may additionally or alternatively generate drive torque. While the engine 102 will be discussed as a gasoline type internal combustion engine (ICE), the engine 102 may include another suitable type of engine, such as a diesel type ICE, an electric type engine, or a hybrid type engine.

Air is drawn into the engine 102 through an intake manifold 104. The volume of air drawn into the engine 102 may be varied using a throttle valve 106. One or more fuel injectors 108 mix fuel with the air to form a combustible air/fuel mixture. The air/fuel mixture is combusted within one or more cylinders of the engine 102, such as cylinder 110. Although the engine 102 is depicted as including one cylinder, the engine 102 may include a greater number of cylinders.

The cylinder 110 includes a piston (not shown) that is mechanically linked to a crankshaft 112. One combustion event within the cylinder 110 may be described in four phases: an intake phase, a compression phase, a combustion (or expansion) phase, and an exhaust phase. During the intake phase, the piston moves toward a bottommost position within the cylinder 110. During the compression phase, the piston moves toward a topmost position and compresses the contents of the cylinder 110.

The combustion phase begins when, for example, spark from a spark plug 114 ignites the air/fuel mixture. The combustion of the air/fuel mixture drives the piston, and the piston drives rotation of the crankshaft 112. Exhaust resulting from combustion is expelled from the cylinder 110 during the exhaust phase. An engine control module (ECM) 116 controls the torque output of the engine 102 based on one or more driver inputs and/or one or more other parameters.

The engine 102 outputs torque to a transmission 120 via the crankshaft 112. The transmission 120 receives torque output by the engine 102 via one or more clutches, such as a torque converter clutch (TCC) or multiple clutches in various types of transmissions. Torque input to the transmission 120 is selectively transferred to a transmission output shaft 122 based on a gear ratio engaged within the transmission 120. The transmission output shaft 122 transfers torque to a differential 124 that transfers torque to one or more wheels (not shown) of the vehicle. In various implementations, one or more other components may be implemented to transfer torque to other wheels of the vehicle.

A transmission control module (TCM) 130 controls the gear ratio of the transmission 120. The TCM 130 may control the gear ratio based on various shift maps, measured parameters (e.g., throttle opening and vehicle speed), and/or inputs from a driver (e.g., upshifts and downshifts). The ECM 116 and the TCM 130 may communicate with one another via a car area network (CAN), for example, to coordinate shifts within the transmission 120 and to share parameters. Gear ratio (or drive ratio) may be defined as the gear ratio of a gearset being used to transfer torque between a transmission input shaft and a transmission output shaft.

Figure 2:
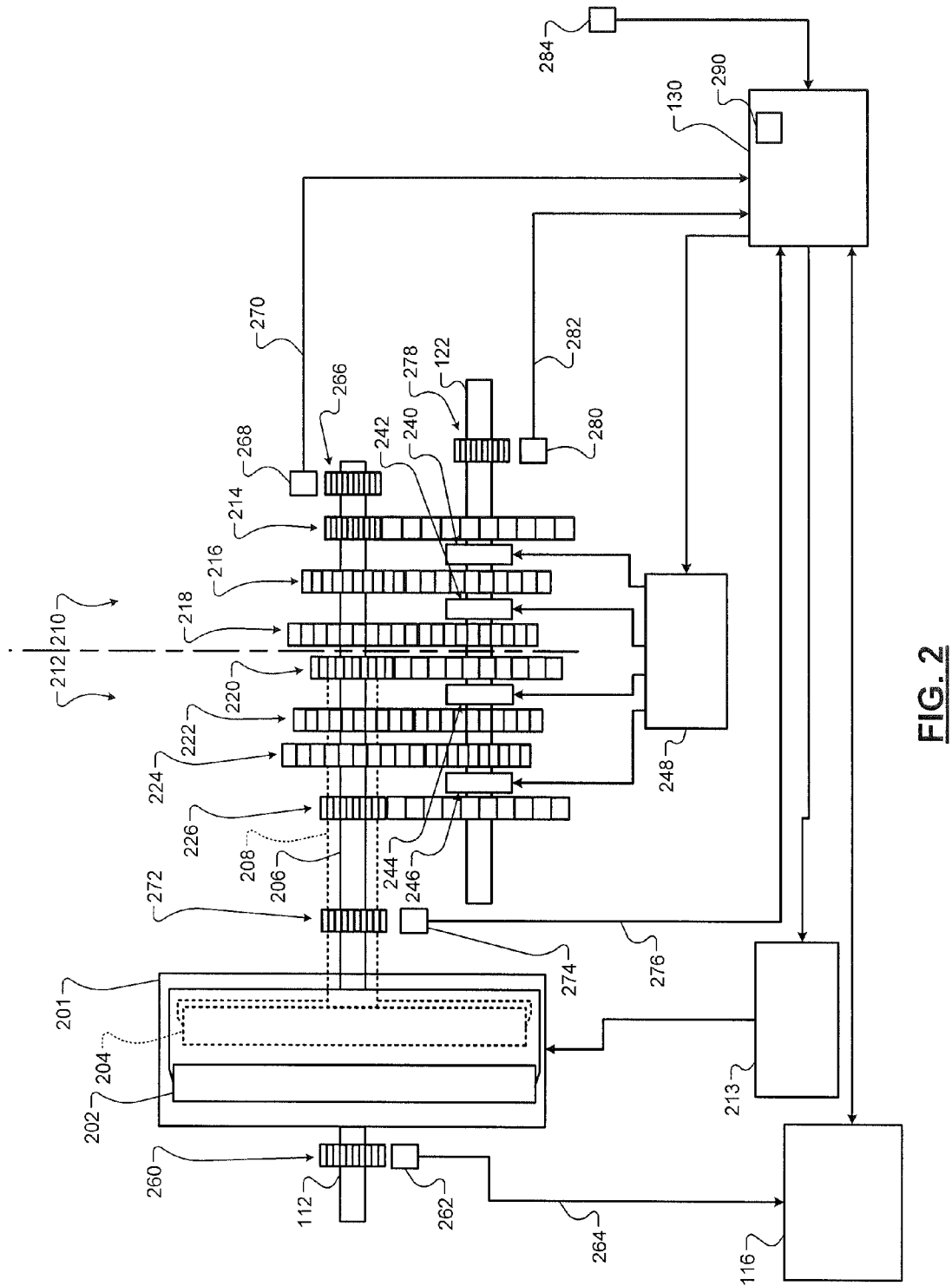
FIG. 2 is a diagram of an example dual clutch transmission (DCT) system according to the present disclosure.

Referring now to FIG. 2, an example diagram of a dual clutch transmission (DCT) system is presented. While the present disclosure will be discussed in the context of the transmission 120 being a DCT, the transmission 120 may be another type of transmission including one or more clutches that are controlled automatically (e.g., by the TCM 130), such as automatic transmissions including a TCC, auto-manual transmissions (AMTs), and clutch to clutch transmissions, continuously variable transmissions (CVTs) (e.g., belt, chain, traction drive, etc.), hybrid transmissions, and other types of transmissions.

The transmission 120 may include a clutch pack 201 that includes two clutches: a first clutch 202 and a second clutch 204. The first clutch 202 is linked to a first input shaft 206, and the second clutch 204 is linked to a second input shaft 208. The first and second input shafts 206 and 208 may be implemented in a nested orientation. More specifically, one of the first and second input shafts 206 and 208 may be located within the other of the first and second input shafts 206 and 208. For example only, the first input shaft 206 may be located within the second input shaft 208 as shown in FIG. 2.

Generally, one of the first and second clutches 202 and 204 is engaged to transfer torque between the engine 102 and the transmission 120 at a given time. First and second return springs (not shown) bias the first and second clutches 202 and 204, respectively, toward disengagement. When the first clutch 202 is engaged, torque is transferred to an odd gearset 210 via the first input shaft 206. Torque is transferred to an even gearset 212 via the second input shaft 208 when the second clutch 204 is engaged.

A clutch actuator module 213 may control the first and second clutches 202 and 204 based on signals from the TCM 130. For example only, the clutch actuator module 213 may control pressures of fluid applied to the first and second clutches 202 and 204 to control engagement, disengagement, and slip of the first and second clutches 202 and 204.

The odd gearset 210 is linked to and rotates with the first input shaft 206. The even gearset 212 is linked to and rotates with the second input shaft 208. The odd gearset 210 includes pairs of input gears and output gears (each pair referred to as a gearset) that provide odd numbered gear ratios.

For example only, the odd gearset 210 may include gearsets 214, 216, and 218 when the transmission 120 is capable of providing six gear ratios (i.e., a six speed transmission). The gearsets 214, 216, and 218 correspond to a first gear ratio, a third gear ratio, and a fifth gear ratio, respectively. The numerical label attributed to a given gear ratio (e.g., first-sixth) may increase as the gear ratio that it provides increases. While the example of six speeds is provided, the transmission 120 may include a greater or lesser number of gear ratios.

The even gearset 212 includes pairs of input gears and output gears (again, each pair referred to as a gearset) that provide even numbered gear ratios. For example only, the even gearset 212 may include gearsets 220, 222, and 224 when the transmission 120 is capable of providing six gear ratios. The gearsets 220, 222, and 224 correspond to a second gear ratio, a fourth gear ratio, and a sixth gear ratio, respectively. A reverse gearset 226 may also be provided with the even gearset 212.

As stated above, the gearsets 214-226 each include an input gear and an output gear. The input gears of the gearsets 214-218 are coupled to and rotate with the first input shaft 206. The input gears of the gearsets 220-226 are coupled to and rotate with the second input shaft 208. The input and output gears of the gearsets 214-226 are meshed, and rotation of the input gear of a gearset causes rotation of the output gear of the gearset.

The first and second clutches 202 and 204 control whether torque is transferred to the odd gearset 210 or to the even gearset 212, respectively. Synchronizers 240, 242, 244, and 246 slide along the transmission output shaft 122 and mechanically couple the output gears of the gearsets 214-224 to the transmission output shaft 122. A gear actuator module 248 may control positions and movement of the synchronizers 240-246 based on signals from the TCM 130. The TCM 130 controls the first and second clutches 202 and 204 and the synchronizers 240-246 to control the gear ratio of the transmission 120.

A first toothed wheel 260 is coupled to and rotates with the crankshaft 112. The first toothed wheel 260 includes a predetermined number of approximately equally spaced teeth. The teeth may be said to be approximately equally spaced to allow for manufacturing tolerances. A crankshaft position sensor 262 monitors rotation of the first toothed wheel 260 and generates a crankshaft position signal 264 based on the rotation of the crankshaft 112. More specifically, the crankshaft position sensor 262 may generate a predetermined pulse in the crankshaft position signal 264 each time a tooth of the first toothed wheel 260 passes the crankshaft position sensor 262. For example only, the crankshaft position sensor 262 may include a variable reluctance (VR) sensor, a Hall Effect sensor, or another suitable type of position sensor.

The ECM 116 determines a position of the crankshaft 112 (crankshaft position) based on the crankshaft position signal 264. The ECM 116 may also determine an engine speed based on the position of the crankshaft 112 and determine an engine acceleration based on the engine speed.

A second toothed wheel 266 is coupled to and rotates with the first input shaft 206. The second toothed wheel 266 includes a predetermined number of approximately equally spaced teeth. A first transmission input shaft (TIS) sensor 268 monitors rotation of the second toothed wheel 266 and generates a first TIS position signal 270 based on the rotation of the first input shaft 206. More specifically, the first TIS sensor 268 may generate a predetermined pulse in the first TIS position signal 270 each time a tooth of the second toothed wheel 266 passes the first TIS sensor 268. For example only, the first TIS sensor 268 may include a VR sensor, a Hall Effect sensor, or another suitable type of position sensor. In various implementations, the second toothed wheel 266 may be omitted, and the first TIS sensor 268 may generate the first TIS position signal 270 based on rotation of one of the input gears of the odd gearset 210.

A third toothed wheel 272 is coupled to and rotates with the second input shaft 208. The third toothed wheel 272 includes a predetermined number of approximately equally spaced teeth. A second TIS sensor 274 monitors rotation of the third toothed wheel 272 and generates a second TIS position signal 276 based on the rotation of the second input shaft 208. More specifically, the second TIS sensor 274 may generate a predetermined pulse in the second TIS position signal 276 each time a tooth of the third toothed wheel 272 passes the second TIS sensor 274. For example only, the second TIS sensor 274 may include a VR sensor, a Hall Effect sensor, or another suitable type of position sensor. In various implementations, the third toothed wheel 272 may be omitted, and the second TIS sensor 274 may generate the second TIS position signal 276 based on rotation of one of the input gears of the even gearset 212.

A fourth toothed wheel 278 is coupled to and rotates with the transmission output shaft 122. The fourth toothed wheel 278 includes a predetermined number of approximately equally spaced teeth. A transmission output shaft (TOS) sensor 280 monitors rotation of the fourth toothed wheel 278 and generates a TOS position signal 282 based on the rotation of the transmission output shaft 122. More specifically, the TOS sensor 280 may generate a predetermined pulse in the TOS position signal 282 each time a tooth of the fourth toothed wheel 278 passes the TOS sensor 280. For example only, the TOS sensor 280 may include a VR sensor, a Hall Effect sensor, or another suitable type of position sensor.

The vehicle may include one or more wheel sensors, such as wheel sensor 284. The wheel sensor 284 generates a wheel signal based on rotation of a wheel. A position of the wheel and a rotational speed of the wheel can be determined based on the wheel signal.

A clutch slip module 290 (see also FIG. 3) may determine a first amount of rotation of an input shaft of the transmission 120 experienced during a predetermined period based on the associated TIS position signal during the predetermined period. The clutch slip module 290 may also determine a second amount of rotation of the second input shaft 208 experienced during the predetermined period based on the second TIS position signal 276 during the predetermined period.

When a gear shift is not occurring and the engaged one of the first and second clutches 202 and 204 that is associated with the input shaft is not slipping, a difference between the first and second amount (adjusted for the ratio between the two shafts) should remain relatively constant. The clutch slip module 290 therefore determines whether the engaged one of the first and second clutches 202 and 204 is slipping based on the difference. The clutch slip module 290 may also measure an amount of slippage of the engaged one of the first and second clutches 202 and 204 based on the difference.

Referring now to FIG. 3, a functional block diagram of an example clutch control system is presented. An updating module 304 generates an update signal 308 each time a predetermined period passes. For example only, the predetermined period may be approximately 25 milliseconds (ms) or another suitable period.

A first time stamping module 312 receives the first TIS position signal 270 and generates a time stamp each time a pulse is detected in the first TIS position signal 270. When the update signal 308 is generated, a first angular rotation module 316 determines an angular rotation of the first input shaft 206. The angular rotation of the first input shaft 206 will be referred to as a first TIS rotation 320 and may correspond to an amount of angular rotation (e.g., in degrees) of the first input shaft 206 during the predetermined period before the generation of the update signal 308. The first angular rotation module 316 determines the first TIS rotation 320 based on the timestamps generated by the first time stamping module 312 during the predetermined period before the generation of the update signal 308.

A second time stamping module 324 receives the second TIS position signal 276 and generates a time stamp each time a pulse is detected in the second TIS position signal 276. When the update signal 308 is generated, a second angular rotation module 328 determines an angular rotation of the second input shaft 208. The angular rotation of the second input shaft 208 will be referred to as a second TIS rotation 332 and may correspond to an amount of angular rotation (e.g., in degrees) of the second input shaft 208 during the predetermined period before the generation of the update signal 308. The second angular rotation module 328 determines the second TIS rotation 332 based on the timestamps generated by the second time stamping module 324 during the predetermined period before the generation of the update signal 308.

A third time stamping module 336 receives the TOS position signal 282 and generates a time stamp each time a pulse is detected in the TOS position signal 282. When the update signal 308 is generated, a third angular rotation module 340 determines an angular rotation of the transmission output shaft 122. The angular rotation of the transmission output shaft 122 will be referred to as a TOS rotation 344 and may correspond to an amount of angular rotation (e.g., in degrees) of the transmission output shaft 122 during the predetermined period before the generation of the update signal 308. The third angular rotation module 340 determines the TOS rotation 344 based on the timestamps generated by the third time stamping module 336 during the predetermined period before the generation of the update signal 308.

A selecting module 348 may select one of the first and second TIS rotations 320 and 332 and set a selected TIS rotation 352 equal to the selected one of the first and second TIS rotations 320. The selecting module 348 may select the first TIS rotation 320 or the second TIS rotation 332 based on which one of the first and second clutches 202 and 204 is engaged. For example, when the first clutch 202 is engaged, the selecting module 348 may select the first TIS rotation 320. The selecting module 348 may select the second TIS rotation 332 when the second clutch 204 is engaged. A clutch control module 356 may generate a clutch signal 360 that indicates which one of the first and second clutches 202 and 204 is engaged.

A difference module 364 determines a rotational difference 368 based on the selected TIS rotation 352, the TOS rotation 344, and the present gear ratio of the transmission 120. For example only, the difference module 364 may set the rotational difference 368 using the equation:

$$\varnothing = TIS - (r_{gr} * TOS),$$

where $\varnothing$ is the rotational difference 368, TIS is the selected TIS rotation 352, $r_{gr}$ is the present gear ratio of the transmission 120, and TOS is the TOS rotation 344. While the rotational difference 368 is discussed as being determined based on TIS rotation, TOS rotation, and the gear ratio of the transmission 120, rotational amounts of one or more other shafts may and the ratio between the two shafts may be used, such as crankshaft rotation and TIS rotation or another suitable combination of shafts. The above equation may be re-written more generally as:

$$\varnothing = Shaft1 - (Ratio * Shaft2),$$

where $\varnothing$ is the rotational difference 368, Shaft1 is the rotation of a first shaft experienced during a predetermined period, Shaft2 is the rotation of a second shaft experienced during the predetermined period, and Ratio is the ratio between the first and second shafts. In hybrid vehicles, rotation of the output shaft of one or more electric motors may be measured (e.g., using a resolver or an encoder) and used.

When the one of the first and second clutches 202 and 204 that is engaged is not slipping and a gear shift is not occurring, the rotational difference 368 should remain approximately constant. When a gear shift is not occurring, a change in the rotational difference 368 may therefore indicate that the one of the first and second clutches 202 and 204 that is engaged is slipping. The change in the rotational difference 368 may also correspond to an amount that the one of the first and second clutches 202 and 204 that is engaged is slipping.

A change module 372 determines a change 376 in the rotational difference 368 based on the rotational difference 368 and a previous (e.g., last) value of the rotational difference 368. For example, the change module 372 determines the change 376 based on a difference between the rotational difference 368 and the previous value of the rotational difference 368.

A slip module 380 indicates whether the engaged one of the first and second clutches 202 and 204 is slipping based on the change 376. For example, the slip module 380 may indicate that the engaged one of the first and second clutches 202 and 204 is not slipping when the change 376 is within a predetermined range around zero. The slip module 380 may indicate that the engaged one of the first and second clutches 202 and 204 is slipping when the change 376 is greater than an upper limit of the predetermined range or less than a lower limit of the predetermined range. For example only, the predetermined range may be from approximately −1.7 degrees to +1.7 degrees or another suitable range. In various implementations, absolute value of the change 376 may be used, and the slip module 380 may indicate that slip occurs when the absolute value of the change 376 is greater than the upper limit of the predetermined range. The slip module 280 may also determine and indicate an amount that the engaged one of the first and second clutches 202 and 204 is slipping based on the change 376.

The slip module 380 generates a slip signal 384 that indicates whether the engaged one of the first and second clutches 202 and 204 is slipping. The slip module 380 may also determine an amount of slip of the engaged one of the first and second clutches 202 and 204, for example, based on the change 376 and one or more previous values of the change 376. The amount of slip of the engaged one of the first and second clutches 202 and 204 may correspond to a difference between an engine speed and the one of the first and second input shafts 206 and 208 that is associated with the engaged one of the first and second clutches 202 and 204.

Determining whether the engaged one of the first and second clutches 202 and 204 is slipping based on the change 376 may be more accurate than determining whether slip is occurring, for example, in other ways, such as based on a difference between a transmission input shaft speed and a transmission output shaft speed or based on a difference between an engine speed and a transmission input shaft speed. The increased accuracy of determining whether the engaged one of the first and second clutches 202 and 204 is slipping based on the change 376 is illustrated in FIG. 4.

Referring now to FIG. 4, an example graph of the change 376 in the rotational difference 368, an engine output torque 404, a transmission input shaft speed 408, a transmission output shaft speed 412, and a pressure applied 416 to the engaged clutch over time 420 is presented. The example of FIG. 4 is provided based on an automatic transmission with a gear ratio of 1:1 (TIS to TOS). The engine torque output 404 is relatively high between times 424 and 428. The high engine torque output 404 may cause the engaged clutch to slip.

The change 376 increases between times 424 and 428, indicating that the engaged clutch is slipping. While the transmission input shaft speed 408 and the transmission output shaft speed 412 also increase between times 424 and 428, a difference between the transmission input shaft speed 408 and the transmission output shaft speed 412 is relatively small, even while the engaged clutch is slipping. The small value of the difference between the transmission input shaft speed 408 and the transmission output shaft speed 412 may render detection of slipping of the engaged clutch (based on the difference) difficult and inaccurate.

The change 376 remains relatively constant for a period after time 428, indicating that the engaged clutch is not slipping. At time 432, the engine output torque 404 increases, and the increase may cause the engaged clutch to slip. The increases and decreases in the change 376 around time 432 indicate that the engaged clutch is slipping. Again, the difference between the transmission input shaft speed 408 and the transmission output shaft speed 412 is small, even while the engaged clutch is slipping.

While the clutch slip module 290 is discussed in terms of a DCT, in transmissions having a single clutch (e.g., a TCC), one of the first and second time stamping modules 312 and 324, the associated one of the first and second angular rotation modules 316 and 328, and the selecting module 348 may be omitted. In such implementations, the difference module 364 may determine the rotational difference 368 based on the one TIS rotation determined, the gear ratio, and the TOS rotation 344. Again, as noted above, while the rotational difference 368 is discussed as being determined based on TIS rotation, TOS rotation, and the gear ratio, rotational amounts of other components (shafts) and the ratio between those components may be used, such as crankshaft rotation and/or wheel rotation.

Referring back to FIG. 3, one or more parameters of the transmission 120 may be controlled based on the slip signal 384. For example, the clutch control module 356 may selectively adjust the pressure applied to the engaged clutch based on the slip signal 384.

The clutch control module 356 may determine a target pressure to be applied to the engaged clutch, and the clutch actuator module 213 may control pressure of transmission fluid applied to the engaged clutch based on the target pressure. When the engaged clutch slips, the clutch control module 356 may selectively increase the target pressure to reduce the slippage toward or to zero. When the engaged clutch is not slipping, the clutch control module 356 may selectively reduce the target pressure until the engaged clutch slips. The clutch control module 356 may selectively adjust the target pressure to adjust the amount of slippage of the engaged clutch based on a predetermined amount.

Additionally or alternatively, a pressure control module 396 may control operation of a transmission fluid pump 398 based on the slip signal 384 to control the pressure of transmission fluid applied to the engaged clutch. When the engaged clutch slips, the pressure control module 396 may selectively increase output of the transmission fluid pump 398 to increase the pressure applied to the engaged clutch and reduce the slippage toward or to zero. When the engaged clutch is not slipping, the pressure control module 396 may selectively reduce the output of the transmission fluid pump 398 until the engaged clutch slips. Maintaining the pressure applied to the engaged clutch at or slightly above the pressure where the engaged clutch begins to slip may decrease torque losses associated with pumping transmission fluid for application to the engaged clutch.

A learning module 388 may learn a pressure 392 to overcome the force of the return spring of a clutch based on the slip signal 384. For example, the learning module 388 may set the pressure 392 equal to the pressure applied to the engaged clutch when the engaged clutch begins to slip. The clutch control module 356 may determine the target pressure based on the pressure 392, for example, during engagement and/or disengagement of that clutch.

The clutch control module 356 may also determine the target pressure based on a difference between a target amount of slip of the engaged clutch and an amount of slip of the engaged clutch determined based on the change 376. For example only, the clutch control module 356 may determine the target pressure based on the difference using closed-loop feedback. A dog (toothed) clutch may be engaged when the slip of the engaged clutch has been reduced to zero. One or more other transmission operating parameters may be adjusted additionally or alternatively based on the slip signal 384.

Referring now to FIG. 5, a flowchart depicting an example method of determining whether a clutch of a transmission is slipping and controlling one or more operating parameters of the transmission is presented. Control may begin with 504 where the updating module 304 resets a timer. At 508, the updating module 304 may increment the timer.

At 512, the first time stamping module 312 generates time stamps based on the first TIS position signal 270, the second TIS sensor 274 generates time stamps based on the second TIS position signal 276, and the third time stamping module 336 generates time stamps based on the TOS position signal 282. The updating module 304 determines whether the value of the timer is greater than the predetermined period (e.g., 25 ms) at 516. If 516 is true, control continues with 520. If 516 is false, control returns to 508.

At 520, the first angular rotation module 316 determines the first TIS rotation 320, the second angular rotation module 328 determines the second TIS rotation 332, and the third angular rotation module 340 determines the TOS rotation 344. The first angular rotation module 316 determines the first TIS rotation 320 based on the timestamps generated by the first time stamping module 312 during the predetermined period. The second angular rotation module 328 determines the second TIS rotation 332 based on the timestamps generated by the second time stamping module 324 during the predetermined period. The third angular rotation module 340 determines the TOS rotation 344 based on the timestamps generated by the third time stamping module 336 during the predetermined period. An example way of determining an amount of rotation of a shaft during a predetermined period that may be employed by the first and second angular rotation modules 316 and 328 is described in commonly assigned U.S. patent application Ser. No. 12/892,832, filed on Sep. 28, 2010 (now U.S. Pat. No. 8,457,847) which is incorporated by reference in its entirety.

The selecting module 348 may select one of the first TIS rotation 320 and the second TIS rotation 332 as the selected TIS rotation 352 at 524. The selecting module 348 selects one of the first TIS rotation 320 and the second TIS rotation 332 based on which one of the first and second clutches 202 and 204 is engaged. For example, the selecting module 348 selects the first TIS rotation 320 when the first clutch 202 is engaged, and the selecting module selects the second TIS rotation 332 when the second clutch 204 is engaged.

The difference module 364 determines the rotational difference 368 at 528. The difference module 364 may determine the rotational difference 368 based on the selected TIS rotation 352, the gear ratio, and the TOS rotation 344. For example, the difference module 364 may set the rotational difference 368 using the equation:

$$\emptyset = TIS - (r_{gr} * TOS),$$

where $\emptyset$ is the rotational difference 368, TIS is the selected TIS rotation 352, $r_{gr}$ is the present gear ratio of the transmission 120, and TOS is the TOS rotation 344. Again, while the rotational difference 368 is discussed as being determined based on TIS rotation, TOS rotation, and the gear ratio of the transmission 120, rotational amounts of one or more other shafts may and the ratio between the two shafts may be used, for example, using the equation:

$$\emptyset = Shaft1 - (Ratio * Shaft2),$$

where $\emptyset$ is the rotational difference 368, Shaft1 is the rotation of a first shaft experienced during a predetermined period, Shaft2 is the rotation of a second shaft experienced during the predetermined period, and Ratio is the ratio between the first and second shafts. In hybrid vehicles, rotation of the output shaft of one or more electric motors may be measured (e.g., using a resolver or an encoder) and used.

At 532, the change module 372 determines the change 376 in the rotational difference 368 based on a difference between the rotational difference 368 and the previous value of the rotational difference 368. At 536, the slip module 380 may determine whether the change 376 is within the predetermined range. If 536 is true, the slip module 380 indicates that the engaged clutch is not slipping at 540, and control may end. If 536 is false, the slip module 380 may indicate that the engaged clutch is slipping at 544. One or more transmission operating parameters may be adjusted at 544 when the engaged clutch slips. For example only, the clutch control module 356 may selectively adjust the target pressure to adjust the pressure applied to the engaged clutch when the engaged clutch slips. Additionally or alternatively, the pressure control module 396 may increase the output of the transmission fluid pump 298 when the engaged clutch slips. While control is shown and discussed as ending, FIG. 5 may be illustrative of one control loop and control may return to 504.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A control system for a transmission of a vehicle, comprising:
   a first angular rotation module that determines a first angular rotation of a first component of the transmission during a predetermined period based on a first signal generated by a first sensor;
   a second angular rotation module that determines a second angular rotation of a second component of the transmission during the predetermined period based on a second signal generated by a second sensor;
   a slip module that, while a gear shift is not occurring, selectively indicates that a clutch of the transmission is slipping based on the first angular rotation and the second angular rotation; and
   a pressure control module that:
      while a gear shift is not occurring, decreases a pressure applied to the clutch in response to the slip module indicating that the clutch is not slipping; and
      while a gear shift is not occurring, increases the pressure applied to the clutch in response to the slip module indicating that the clutch is slipping.

2. The control system of claim 1 wherein the first component is a transmission input shaft (TIS), the first sensor is a TIS sensor, the second component is a transmission output shaft (TOS), and the second sensor is a TOS sensor.

3. The control system of claim 2 further comprising:
   a difference module that determines a difference in rotation of the TIS and the TOS during the predetermined period based on the first angular rotation, the second angular rotation, and a gear ratio of the transmission,
   wherein the slip module selectively indicates that the clutch is slipping based on the difference.

4. The control system of claim 3 wherein the difference module sets the difference based on the first angular rotation minus a value equal to a product of the second angular rotation and the gear ratio.

5. The control system of claim 3 further comprising:
   a change module that determines a change in the difference based on the difference and a previous value of the difference,
   wherein the slip module selectively indicates that the clutch is slipping based on the change.

6. The control system of claim 5 wherein the slip module indicates that the clutch is slipping when the change is one of greater than and less than a predetermined value.

7. The control system of claim 2 further comprising:
   a third angular rotation module that determines a third angular rotation of a second TIS during the predetermined period based on a third signal generated by a second TIS sensor,
   wherein the slip module selectively indicates that the clutch is slipping based on the second angular rotation and a selected one of the first angular rotation and the third angular rotation.

8. The control system of claim 7 further comprising a selecting module that selects one of the first angular rotation and the third angular rotation based on whether the clutch is coupled to the TIS or to the second TIS.

9. The control system of claim 1 further comprising a pressure control module that selectively adjusts output of a transmission fluid pump based on whether the slip module indicates that the clutch is slipping.

10. A control method for a vehicle, comprising:
    determining a first angular rotation of a first component of a transmission during a predetermined period based on a first signal generated by a first sensor;
    determining a second angular rotation of a second component of the transmission during the predetermined period based on a second signal generated by a second sensor;
    while a gear shift is not occurring, selectively indicating that a clutch of a transmission is slipping based on the first angular rotation and the second angular rotation; and
    while a gear shift is not occurring:
       decreasing a pressure applied to the clutch in response to the indication that the clutch is not slipping; and
       increasing the pressure applied to the clutch in response to the indication that the clutch is slipping.

11. The control method of claim 10 wherein the first component is a transmission input shaft (TIS), the first sensor is a TIS sensor, the second component is a transmission output shaft (TOS), and the second sensor is a TOS sensor.

12. The control method of claim 11 further comprising:
    determining a difference in rotation of the TIS and the TOS during the predetermined period based on the first angular rotation, the second angular rotation, and a gear ratio of the transmission; and
    selectively indicating that the clutch is slipping based on the difference.

13. The control method of claim 12 further comprising setting the difference based on the first angular rotation minus a value equal to a product of the second angular rotation and the gear ratio.

14. The control method of claim 12 further comprising:
    determining a change in the difference based on the difference and a previous value of the difference; and
    selectively indicating that the clutch is slipping based on the change.

15. The control method of claim 14 further comprising indicating that the clutch is slipping when the change is one of greater than and less than a predetermined value.

16. The control method of claim 11 further comprising:
    determining a third angular rotation of a second TIS during the predetermined period based on a third signal generated by a second TIS sensor; and
    selectively indicating that the clutch is slipping based on the second angular rotation and a selected one of the first angular rotation and the third angular rotation.

17. The control method of claim 16 further comprising selecting one of the first angular rotation and the third angular rotation based on whether the clutch is coupled to the TIS or to the second TIS.

18. The control method of claim 10 further comprising selectively adjusting output of a transmission fluid pump based on whether the clutch is slipping.

* * * * *